(12) United States Patent
Kerzner et al.

(10) Patent No.: US 10,529,101 B1
(45) Date of Patent: Jan. 7, 2020

(54) MONITORING SYSTEM ANALYTICS

(71) Applicant: Alarm.com Incorporated, Tysons, VA (US)

(72) Inventors: Daniel Kerzner, McLean, VA (US); Abraham Joseph Kinney, Vienna, VA (US); Luis Fernando Guzman Verbena, Fairfax, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 16/296,461

(22) Filed: Mar. 8, 2019

Related U.S. Application Data

(63) Continuation of application No. 15/069,317, filed on Mar. 14, 2016, now Pat. No. 10,249,069.

(60) Provisional application No. 62/132,455, filed on Mar. 12, 2015.

(51) Int. Cl.
  *G06T 11/20* (2006.01)
  *G08B 5/22* (2006.01)
  *G06K 9/00* (2006.01)
  *G06F 3/048* (2013.01)

(52) U.S. Cl.
  CPC ........ *G06T 11/206* (2013.01); *G06K 9/00771* (2013.01); *G08B 5/22* (2013.01); *G06F 3/048* (2013.01)

(58) Field of Classification Search
  CPC .... G06T 11/206; G06F 3/048; G06K 9/00771
  See application file for complete search history.

(56) References Cited

U.S. PATENT DOCUMENTS

| | | |
|---|---|---|
| 8,098,156 B2 | 1/2012 | Caler |
| 9,280,590 B1 | 3/2016 | McPhie |
| 2003/0025599 A1 | 2/2003 | Monroe |
| 2007/0156060 A1 | 7/2007 | Cervantes |
| 2010/0023865 A1 | 1/2010 | Fulker |
| 2010/0156655 A1 | 6/2010 | Bullemer |
| 2013/0321245 A1 | 12/2013 | Harper |

*Primary Examiner* — Michelle L Sams
(74) *Attorney, Agent, or Firm* — Fish & Richardson P.C.

(57) ABSTRACT

Techniques are described for presenting events detected by a monitoring system. A system receives a selection of a particular time period, identifies security events detected by a monitoring system during the selected time period, and classifies a subset of the identified security events as abnormal events. The system further generates a density of the identified security events over the selected time period, generates a density of the subset of the identified security events classified as abnormal events, and identifies monitoring system data associated with the selected time period. The system additionally generates a graphical representation of the density of the identified security events, the density of the subset of the identified security events classified as abnormal events, and the identified monitoring system data, and provides the graphical representation for display.

20 Claims, 8 Drawing Sheets

400

| Detected Pattern | Confidence |
|---|---|
| Lack of activity on Saturday between 7 AM and 1 PM | 60 |
| Arm "Stay" by 11 PM Daily when all users are detected as being at home | 90 |
| Arm "Away" by 9 AM Monday to Friday when all users are detected as being away from home | 95 |
| Window opening preceded by interior motion detection | 100 |
| Back door opening preceded by interior motion detection Daily between 6 AM to 7 AM and 10 PM and 11 PM | 80 |
| Lack of activity on Sunday between 8 AM and 12 PM | 70 |

FIG. 4

MONITORING SYSTEM ANALYTICS

CROSS-REFERENCE TO RELATED APPLICATIONS

This application is a continuation of U.S. application Ser. No. 15/069,317, filed Mar. 14, 2016, now allowed, which claims the benefit of U.S. Application Ser. No. 62/132,455, filed on Mar. 12, 2015. Both of these prior applications are incorporated by reference in their entirety.

TECHNICAL FIELD

This disclosure relates to monitoring technology and, for example, presenting events detected by a monitoring system.

BACKGROUND

Many people equip homes and businesses with alarm systems to provide increased security for their homes and businesses. Alarm systems may include control panels that a person may use to control operation of the alarm system and sensors that monitor for security breaches. In response to detecting events, the alarm system may store electronic data representing the detected events. A user may later view the events represented by the stored electronic data.

SUMMARY

Techniques are described for monitoring technology. For example, techniques are described for intelligently presenting events detected by a monitoring system.

Implementations of the described techniques may include hardware, a method or process implemented at least partially in hardware, or a computer-readable storage medium encoded with executable instructions that, when executed by a processor, perform operations including receiving a selection of a particular time period, identifying security events detected by a monitoring system during the selected time period, and classifying a subset of the identified security events as abnormal events. The operations further include generating a density of the identified security events over the selected time period, generating a density of the subset of the identified security events classified as abnormal events, and identifying monitoring system data associated with the selected time period. The operations include generating a graphical representation of the density of the identified security events, the subset of the identified security events classified as abnormal events, and the identified monitoring system data, and conclude with providing the graphical representation for display.

The details of one or more implementations are set forth in the accompanying drawings and the description below. Other features will be apparent from the description and drawings, and from the claims.

DESCRIPTION OF DRAWINGS

FIG. 4 illustrates an example data record.

DETAILED DESCRIPTION

Techniques are described for intelligently presenting events detected by a monitoring system. For instance, an analysis engine may perform analytics on monitoring system data to intelligently present events detected by the monitoring system over a timeline. In generating the timeline, the analysis engine may weight events based on importance (e.g., user-specified importance or manufacturer-specified importance) and a weighted density of events at various points may be illustrated in the timeline. In some implementations, the timeline may also be augmented with abnormality data to highlight or provide greater weight to events that have higher degrees of abnormality in the timeline. In intelligently presenting events, the analysis engine may also present monitoring system data associated with particular times. For instance, the analysis engine may associate images taken with a particular time. When a user requests to view information related to an event that occurred during the particular time, the analysis engine may identify the images based on the image's association with the particular time and, in response, present the images. In this regard, the analysis engine may intelligently present events detected by the monitoring system so that a user may more easily understand events detected by the monitoring system.

Figure 1A:
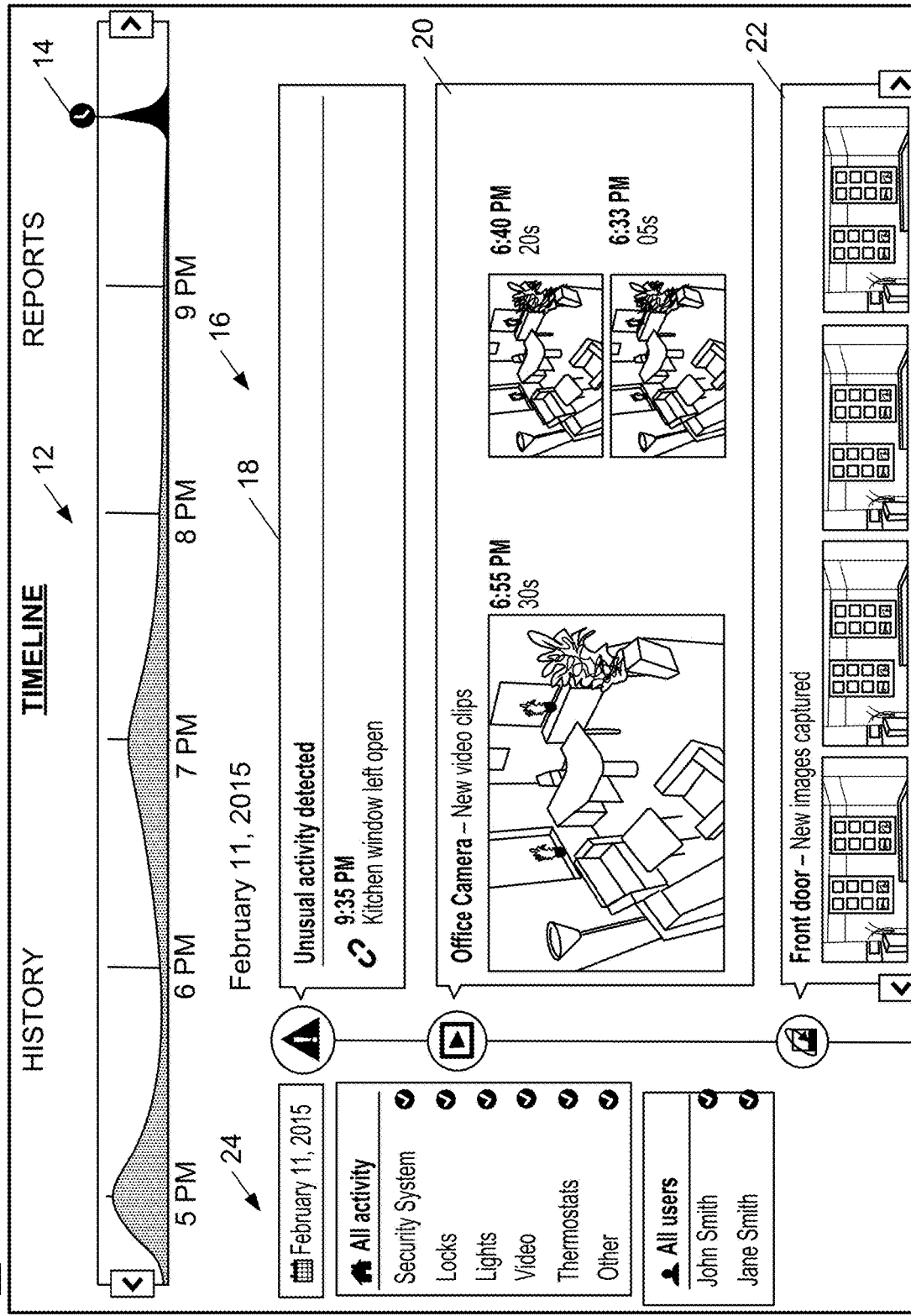
FIGS. 1A-1B illustrate example interfaces intelligently presenting events detected by a monitoring system.
Figure 1B:
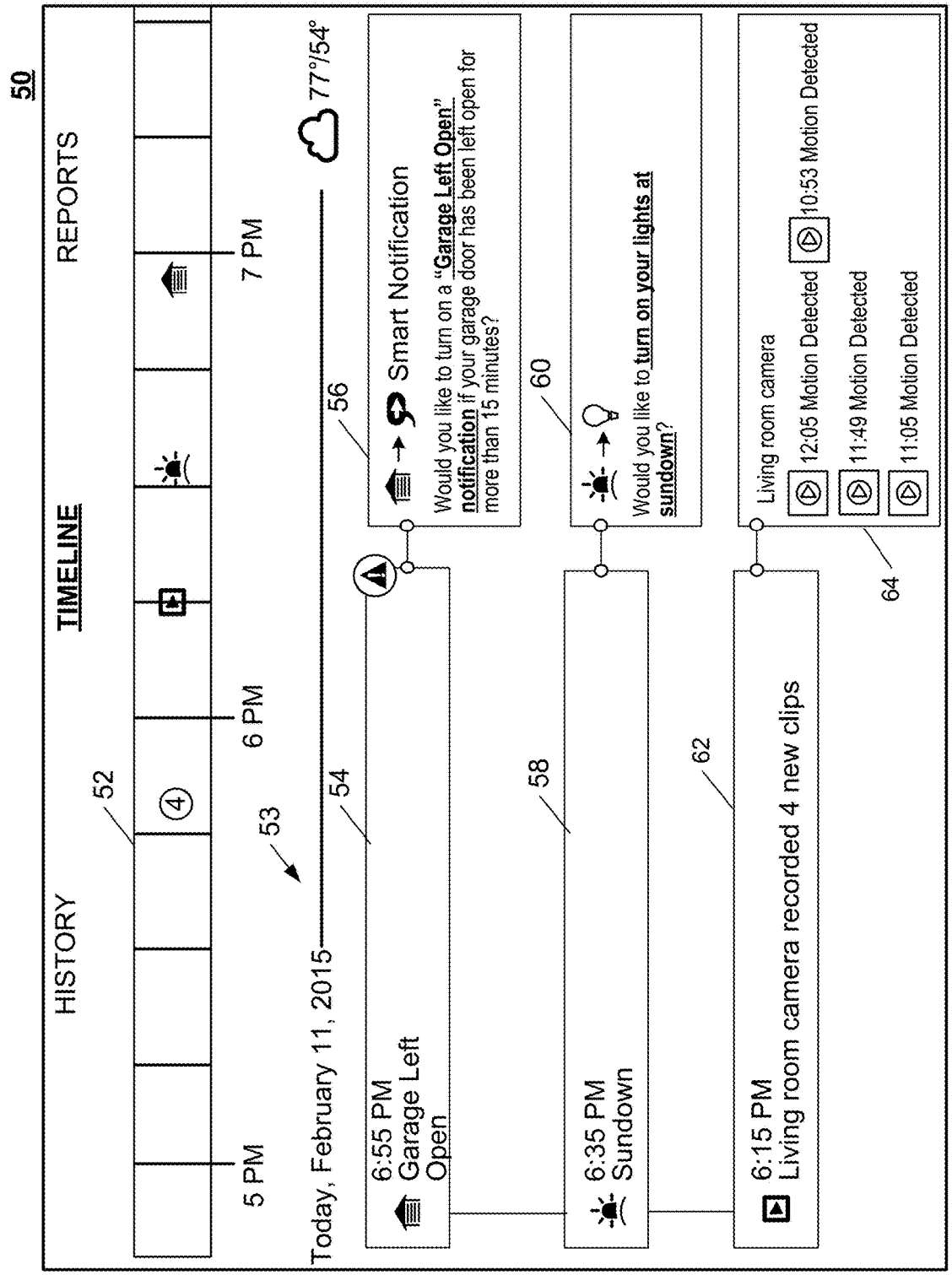

FIGS. 1A-1B illustrate example interfaces intelligently presenting events detected by a monitoring system. As shown in FIG. 1A, the interface 10 includes a timeline panel 12 presenting a timeline of a density of events detected by a monitoring system, a monitoring system data stream panel 16 presenting monitoring system data matching the timeline, and a selection panel 24 providing options for a user to select monitoring system data to include in the timeline.

The timeline panel 12 includes a timeline that represents density of events detected by the monitoring system. The density of events may refer to the number of events detected within a particular range of time. For instance, the density of events for a thirty minute time interval with two detected events may be twice the density of events for another thirty minute time interval with a single detected event. In some implementations, the density of events may be based on weighting events based on importance. For instance, particular types of events may be considered to be more important. Accordingly, the particular types of events that may be considered more important may be associated with greater weights, and the particular types of events that may be considered less important may be associated with lesser weights. For example, an event indicating a door leading to outside the house was opened may be more important than an event indicating a door between rooms of the house was opened. Accordingly, the event indicating a door leading to outside the house was opened may be associated with a weight that is three times greater, e.g., 0.6, than the weight, e.g., 0.2, associated with the event indicating a door between rooms of the house was opened.

The weights for particular types of events may be user-specified. For instance, the user may specify the weight the user wants to associate with events indicating a door leading to outside the house was opened, and also specify the weight the user wants to associate with events indicating a door between rooms of the house was opened. The user may specify the weights in an administration mode where the user may select one or more types of events and specify, for example input, a weight to assign to the selected one or more types of events.

In some implementations, the manufacturer may specify weights to associate with particular types of events. For instance, the manufacturer may specify a default weight to associate with events indicating a door leading to outside the house was opened, and also specify a default weight to associate with events indicating a door between rooms of the house was opened. The default weights may be overridden by user-specified weights. For instance, if no user-specified weight is associated with a particular type of event, an analysis engine may use a default weight for the particular type of event.

In some implementations, an analysis engine can calculate weights to associate with particular types of events. For example, if neither the manufacturer nor a user has specified a weight for events indicating a window opening from the outside during daytime, the analysis engine can calculate a weight for the event. The analysis engine can calculate weights for events based on factors such as weights for similar events, such as windows opening from the outside during nighttime, doors opening from the outside during daytime, etc. The calculated weights can be overridden by the manufacturer or user. For instance, a user can review calculated weights and set a new weight for the event.

In some implementations, the user or manufacturer can be presented with a prompt or otherwise notified that the analysis engine has calculated a weight for the event. The user or manufacturer can be presented with the option to accept the calculated weight or to set a new weight. The analysis engine can learn from the actions of the user or manufacturer and use historical action data to calculate new weights for events. For example, if the manufacturer specifies a weight for a window opening from the inside at night and a person exiting the house, the analysis engine can use the specified weight for similar future events across different homes.

In some implementations, weights may also be specified based on the time that the event occurs. For example, a user or manufacturer may specify that events that occur during the night should be assigned with weights that are 25% greater than weights assigned to the same events during the day. In another example, the user may specify that events that occur between 11 AM to 4 PM, when no one is supposed to be home, may be assigned with weights that are 50% greater than weights assigned to the same events at other times.

In some implementations, weights can be determined or selected based on a combination of events. For example, a series of events in which the garage door opens, the lock of an adjoining door is opened, and the door opens, can be interpreted as an arrival event. Weights assigned to events can be based on factors other than abnormality. For example, if a user is particularly interested in tracking times at which he leaves for work and comes home, he can assign a greater weight to arrival and departure events. The weight assigned to an arrival event can be selected to be larger than a weight for an event such as movement detected from within the home during the day. For example, weights for movement events from a pet dog can be specified to be lower than combination events such as a departure event.

In some implementations, weights can be determined or selected based on the person performing an action in a detected event or combination of events. Monitoring data, such as video or image data, can be used to identify the person entering or departing the home. For example, an event can be detected in which a housekeeper unlocks the front door and enters. Weights assigned to events including a specific person can be adjusted. For example, a user can specify certain people for whom event weights are low, such as the housekeeper, a neighbor, or family members.

In some implementations, the analysis system can monitor detected events for patterns, and learn from user or manufacturer actions. For example, if the housekeeper enters the house every Wednesday at 11:00 a.m., the analysis system can use historical data to determine that the event is a recurring event, and can assign the event a lesser weight. In some implementations, the analysis system can detect from historical data that the user that events involving the housekeeper should be given a greater weight and assign subsequent events involving the housekeeper a greater weight. The analysis system can learn or be taught that some events, although related to a particular person, should be assigned a greater weight, according to a user's preferences. For example, movement events from inside a home involving the housekeeper can be assigned lower weights, while arrival and departure events can be assigned greater weights.

The timeline may show intervals that are ranges of time. For instance, the length of a range of time may be fifteen minutes, thirty minutes, an hour, two hours, or a day. The length of a range of a time may vary based on a scale specified by a user. For instance, a user may select to view a timeline that spans a single day, two days, a week, or a month, and the ranges of the timeline may be varied in response to the user's selection.

The density of events for a particular time may refer to the density of events for a particular time range, where the middle of the time range is the particular time. For instance, the density of events for 7 PM where the time range is an hour may refer to the density of events for the time range of 6:30 PM to 7:30 PM. In another example, the density of events for 5:15 PM where the time range is thirty minutes may refer to the density of events for the time range of 5:00 PM to 5:30 PM.

In FIG. 1A, the timeline shown represents a density of events with a height of a line that represents the density of events for a particular time. For instance, times associated with a greater density of events may be associated with portions of the line that are higher than portions of the line associated with lower density of events. In some implementations, the line may be the best fitting curve that matches the density of events for particular times. In some other implementations, the timeline may represent the density of events in other forms besides the height of a line. For instance, the timeline may represent the density of events with dots that represent the density of events for a particular time, where the dots represent a density of events using one or more of different heights, colors, sizes, or shapes.

In some implementations, the timeline may also be augmented with abnormality data to highlight events that have higher degrees of abnormality in the timeline. Abnormality data may be data that indicates that a particular event does not occur in a recurring pattern of events. For instance, the abnormality data may indicate that an event associated with a front door of a home opening at 3 AM is abnormal. The timeline may be augmented with abnormality data by visually modifying the timeline. For example, as shown by the portion of the timeline associated with a time selection icon 14, portions of the timeline that include abnormal events may be displayed in a solid color, while portions of the timeline that include normal events may be displayed with shading or dotting. In some implementations, portions of the timeline that include abnormal events may be colored red. In some other implementations, the timeline may highlight events that have higher degrees of abnormality with other methods. For instance, a portion of a timeline that is associated with both a single normal event and a single abnormal event may be represented by a shaded hill to represent the single abnormal event, where the shaded hill is within an unshaded hill that is twice the height to represent a total of two events for the particular time.

In some implementations, the weight of abnormal events is greater than the weights of normal events. For example, an event that is indicated by abnormality data as abnormal may be associated with a weight that is three times greater than a corresponding event that is not indicated as abnormal. In some implementations, the weight of abnormal events is relative to a confidence score that reflects a level of confidence that the event is abnormal. For instance, an event that is associated with abnormality data that indicates 50% confidence that the event is abnormal may be weighted twice that of an event that is indicated as being normal, and an event that is associated with abnormality data that indicates 90% confidence that the event is abnormal may be weighted three times that of an event that is indicated as being normal. The weight based confidence score may be dependent on discrete thresholds. For example, events with abnormality confidence scores less than 50% may not have a weight increase, abnormality confidences scores between 50% and 80% may be associated with a double weight, and abnormality confidence scores greater than 80% may be associated with a triple weight. The weights based on confidence score may alternatively be dependent on proportion. For instance, the weight of an event may be increased based on predetermined number, e.g., two, three, five, etc., times the percentage of confidence indicated by a confidence score.

The interface 10 includes a monitoring system data stream panel 16 presenting monitoring system data according to the timeline. The stream panel 16 may present monitoring system data in a time sequential fashion. For instance, the stream panel 16 may show camera images and events detected in reverse chronological order, with more recent monitoring system data at the top and less recent monitoring system data at the bottom.

The stream panel 16 may by responsive to user requests to view monitoring system data associated with particular times. For instance, an analysis engine may receive a request from the user to view monitoring system data associated with 10 PM. In response, the stream panel 16 may be updated to display an event item 18 that indicates that unusual activity was detected at 9:35 PM, where the unusual activity was that the kitchen window was left open. The stream panel 16 may also be updated to show camera item 20 that shows that the latest event before the event item 18 was storing new video clips from an office camera and show camera item 22 that shows that the second latest event before the event item 18 was capturing images of the front door.

In some implementations, when a particular time is selected, the stream panel 16 may be updated to also show the immediate monitoring system data after the particular time. For instance, an analysis engine may receive a request from the user to view monitoring system data associated with 2 AM that is indicated as including an abnormal event of motion being detected in the backyard. In response, the stream panel 16 may be updated to display the most recent image of the backyard captured before the motion was detected, an image of the backyard captured when the motion was detected, and an image of the backyard captured after motion was no longer detected.

As discussed above, the timeline panel 12 may include a time selection icon 14. The user may provide a request to view monitoring system data associated with a particular time by moving the time selection icon 14 to the particular time. For instance, the user currently viewing monitoring system data associated with 10 PM may request to view monitoring system data associated with 8 PM by sliding the time selection icon 14 to 8 PM on the timeline. In some implementations, the interface 10 may include alternate methods for a user to provide a request to view monitoring system data associated with a particular time. For instance, the interface 10 may include a date and time dropdown box or a date and time text entry box.

The interface 100 includes a selection panel 24 that provides options for a user to select monitoring system data to view. The selection panel 24 includes selection elements for a user to specify a particular date, particular types of events, or particular users for viewing monitoring system data. The selection element for date may enable the user to specify for which date to view a timeline. For instance, the selection element may open a calendar selection window for the user to select a particular date.

The selection element for types of events may enable a user to toggle particular types of events to display in the timeline and for display of monitoring system data in the stream panel 16. For instance, if the user selects to toggle off events related to lights, the analysis engine may display a timeline that ignores events with the event type of lights. The types of events may include security system, locks, lights, video, thermostats, and others.

In some implementations, the analysis engine can infer event types and assign types to events, such as Leaving Home, Arriving Home, Opening Up for Business, Waking Up, etc. The analysis engine can determine event types through historical data from the specific user associated with the security system, or from data collected from other users of the monitoring system. For example, a small business owner opens her store for business at 7:00 a.m. every weekday. The series of events associated with Opening Up for Business can be turning the lights on, unlocking the front door, opening the front door, and turning on the sign. The analysis engine can carry over the inference to another small business owner and automatically group the same set of events into the Opening Up for Business type.

The analysis engine inferences can be overridden by the user or manufacturer. In some implementations, event types can be specified by the user or manufacturer. For example, a user can input a series of events such as: opening the back door; leaving the back door open for 15 minutes; and closing the back door, to be associated with a Letting the Dog Out type.

The selection element can provide users with the ability to select analysis engine inferred types for display in the timeline. For example, the selection element can list the inferred event types as selectable types. In some implementations, a user can filter by an inferred event time across a time range. The time range can be any amount of time, for example, the time range can be two weeks, a month, three years, etc. For example, a user can select Leaving Home across a period of two months to see when he has left the house for work every morning.

The analysis engine can group a series of events associated with an event type for display. For example, if a user has selected to filter by Waking Up events for a period of one month, a single image, video, or other monitoring data representative of Waking Up for each day can be shown. In some implementations, a single image, video, or portion of monitoring data can be shown for all events of an event type. The analysis engine can group the series of events associated with an event type and direct the user to the set of events when the user selects the representative portion of monitoring data.

The selection element for users may enable a user to toggle particular types of events associated with a user. Users may define particular types of events specific to the user. Accordingly, toggling off particular types of events specific to the user may update a timeline to ignore all events associated with the user.

As shown in FIG. 1B, the interface 100 includes an alternate timeline panel 52 and monitoring system data stream panel 53. The alternate timeline panel 52 may include a timeline that represents events that are associated with automated actions. For instance, the timeline may show icons at particular times, where the icons represent events that are associated with automated actions. Automated actions may include actions that automatically occurred, e.g., capturing images when motion is detected, or an automated suggestion for an action, e.g., turning on lights at sundown. The events that are associated with automated actions may be events for which automated actions may occur or be suggested. For example, a detected event of garage left open may be associated with the automated suggestion for an action of enabling a notification if the garage is left open, and a detected event of sunset may be associated with an automated suggestion of turning on lights. The icon that represents an event may indicate a type of the event. For instance, an icon of a sunset may indicate an event related to sunset and an icon of a play button may indicate an event related to recording video.

The monitoring system data stream panel 53 displays the events in reverse chronological order and automated actions or suggestions associated with the events. For instance, event items 54, 58, 62 of "Garage Left open," "Sundown," and "Living room camera recorded 4 new clips" are displayed in reverse chronological order on the left side of the monitoring system data stream panel 53 and associated automated actions and suggestions items 56, 60, and 64 are shown to the immediate right of the respective associated event.

Figure 2:
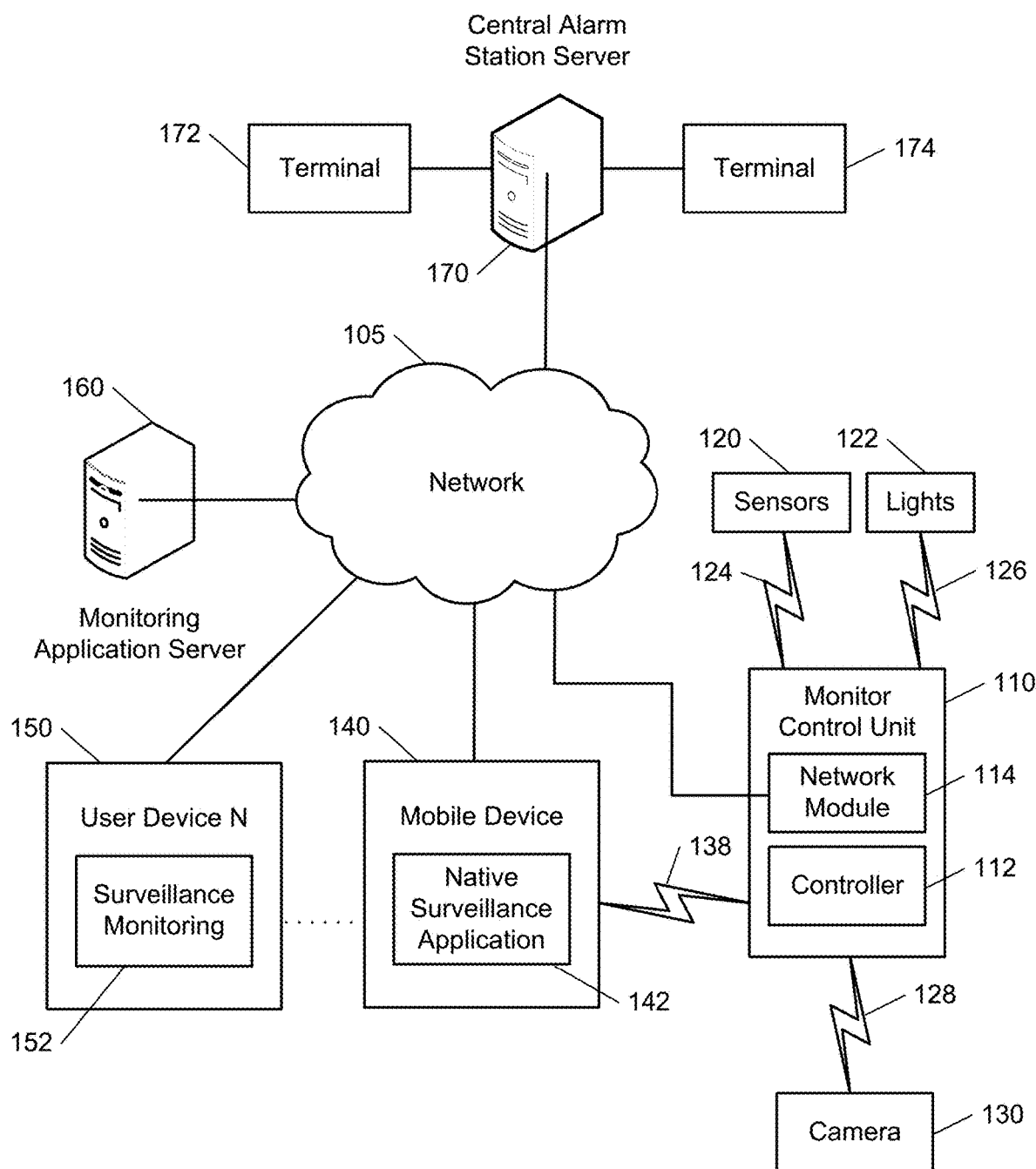
FIGS. 2 and 5 illustrate an example system.

FIG. 2 illustrates an example of an electronic system 200 configured to provide surveillance and reporting. The electronic system 200 includes a network 105, a monitoring system control unit 110, one or more user devices 140, 150, a monitoring application server 160, and a central alarm station server 170. In some examples, the network 105 facilitates communications between the monitoring system control unit 110, the one or more user devices 140, 150, the monitoring application server 160, and the central alarm station server 170.

The network 105 is configured to enable exchange of electronic communications between devices connected to the network 105. For example, the network 105 may be configured to enable exchange of electronic communications between the monitoring system control unit 110, the one or more user devices 140, 150, the monitoring application server 160, and the central alarm station server 170. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 105 may include multiple networks or subnetworks, each of which may include, for example, a wired or wireless data pathway. The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The monitoring system control unit 110 includes a controller 112 and a network module 114. The controller 112 is configured to control a monitoring system (e.g., a home alarm or security system) that includes the monitoring system control unit 110. In some examples, the controller 112 may include a processor or other control circuitry configured to execute instructions of a program that controls operation of an alarm system. In these examples, the controller 112 may be configured to receive input from sensors, detectors, or other devices included in the alarm system and control operations of devices included in the alarm system or other household devices (e.g., a thermostat, an appliance, lights, etc.). For example, the controller 112 may be configured to control operation of the network module 114 included in the monitoring system control unit 110.

The network module 114 is a communication device configured to exchange communications over the network 105. The network module 114 may be a wireless communication module configured to exchange wireless communications over the network 105. For example, the network module 114 may be a wireless communication device configured to exchange communications over a wireless data channel and a wireless voice channel. In this example, the network module 114 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: GSM or GPRS, CDMA, EDGE or EGPRS, EV-DO or EVDO, UMTS, or IP.

The network module 114 also may be a wired communication module configured to exchange communications over the network 105 using a wired connection. For instance, the network module 114 may be a modem, a network interface card, or another type of network interface device. The network module 114 may be an Ethernet network card configured to enable the monitoring system control unit 110 to communicate over a local area network and/or the Internet. The network module 114 also may be a voiceband modem configured to enable the alarm panel to communicate over the telephone lines of Plain Old Telephone Systems (POTS). The monitoring system that includes the monitoring system control unit 110 includes one or more sensors or detectors. For example, the monitoring system may include multiple sensors 120. The sensors 120 may include a contact sensor, a motion sensor, a glass break sensor, or any other type of sensor included in an alarm system or security system. The sensors 120 also may include an environmental sensor, such as a temperature sensor, a water sensor, a rain sensor, a wind sensor, a light sensor, a smoke detector, a carbon monoxide detector, an air quality sensor, etc. The sensors 120 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 120 may include a radio-frequency identification (RFID) sensor that identifies a particular article that includes a pre-assigned RFID tag.

The monitoring system control unit 110 communicates with the module 122 and the camera 130 to perform surveillance or monitoring. The module 122 is connected to one or more lighting systems and is configured to control operation of the one or more lighting systems. The module 122 may control the one or more lighting systems based on commands received from the monitoring system control unit 110. For instance, the module 122 may cause a lighting system to illuminate an area to provide a better image of the area when captured by a camera 130.

The camera 130 may be a video/photographic camera or other type of optical sensing device configured to capture images. For instance, the camera 130 may be configured to capture images of an area within a building monitored by the monitoring system control unit 110. The camera 130 may be configured to capture single, static images of the area and also video images of the area in which multiple images of the area are captured at a relatively high frequency (e.g., thirty images per second). The camera 130 may be controlled based on commands received from the monitoring system control unit 110.

The camera 130 may be triggered by several different types of techniques. For instance, a Passive Infra Red (PIR) motion sensor may be built into the camera 130 and used to trigger the camera 130 to capture one or more images when motion is detected. The camera 130 also may include a microwave motion sensor built into the camera and used to trigger the camera 130 to capture one or more images when motion is detected. The camera 130 may have a "normally open" or "normally closed" digital input that can trigger capture of one or more images when external sensors (e.g., the sensors 120, PIR, door/window, etc.) detect motion or other events. In some implementations, the camera 130 receives a command to capture an image when external devices detect motion or another potential alarm event. The camera 130 may receive the command from the controller 112 or directly from one of the sensors 120.

In some examples, the camera 130 triggers integrated or external illuminators (e.g., Infra Red, Z-wave controlled "white" lights, lights controlled by the module 122, etc.) to improve image quality when the scene is dark. An integrated or separate light sensor may be used to determine if illumination is desired and may result in increased image quality.

The camera 130 may be programmed with any combination of time/day schedules, system "arming state", or other variables to determine whether images should be captured or not when triggers occur. The camera 130 may enter a low-power mode when not capturing images. In this case, the camera 130 may wake periodically to check for inbound messages from the controller 112. The camera 130 may be powered by internal, replaceable batteries if located remotely from the monitoring control unit 110. The camera 130 may employ a small solar cell to recharge the battery when light is available. Alternatively, the camera 130 may be powered by the controller's 112 power supply if the camera 130 is co-located with the controller 112.

The sensors 120, the module 122, and the camera 130 communicate with the controller 112 over communication links 124, 126, and 128. The communication links 124, 126, and 128 may be a wired or wireless data pathway configured to transmit signals from the sensors 120, the module 122, and the camera 130 to the controller 112. The sensors 120, the module 122, and the camera 130 may continuously transmit sensed values to the controller 112, periodically transmit sensed values to the controller 112, or transmit sensed values to the controller 112 in response to a change in a sensed value.

The communication link 128 over which the camera 130 and the controller 112 communicate may include a local network. The camera 130 and the controller 112 may exchange images and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 6 (CAT6) wired Ethernet network.

The monitoring application server 160 is an electronic device configured to provide monitoring services by exchanging electronic communications with the monitoring system control unit 110, the one or more user devices 140, 150, and the central alarm station server 170 over the network 105. For example, the monitoring application server 160 may be configured to monitor events (e.g., alarm events) generated by the monitoring system control unit 110. In this example, the monitoring application server 160 may exchange electronic communications with the network module 114 included in the monitoring system control unit 110 to receive information regarding events (e.g., alarm events) detected by the monitoring system control unit 110. The monitoring application server 160 also may receive information regarding events (e.g., alarm events) from the one or more user devices 140, 150.

In some examples, the monitoring application server 160 may route alarm data received from the network module 114 or the one or more user devices 140, 150 to the central alarm station server 170. For example, the monitoring application server 160 may transmit the alarm data to the central alarm station server 170 over the network 105.

The monitoring application server 160 may store sensor and image data received from the monitoring system and perform analysis of sensor and image data received from the monitoring system. Based on the analysis, the monitoring application server 160 may communicate with and control aspects of the monitoring system control unit 110 or the one or more user devices 140, 150.

The central alarm station server 170 is an electronic device configured to provide alarm monitoring service by exchanging communications with the monitoring system control unit 110, the one or more mobile devices 140, 150, and the monitoring application server 160 over the network 105. For example, the central alarm station server 170 may be configured to monitor alarm events generated by the monitoring system control unit 110. In this example, the central alarm station server 170 may exchange communications with the network module 114 included in the monitoring system control unit 110 to receive information regarding alarm events detected by the monitoring system control unit 110. The central alarm station server 170 also may receive information regarding alarm events from the one or more mobile devices 140, 150.

The central alarm station server 170 is connected to multiple terminals 172 and 174. The terminals 172 and 174 may be used by operators to process alarm events. For example, the central alarm station server 170 may route alarm data to the terminals 172 and 174 to enable an operator to process the alarm data. The terminals 172 and 174 may include general-purpose computers (e.g., desktop personal computers, workstations, or laptop computers) that are configured to receive alarm data from a server in the central alarm station server 170 and render a display of information based on the alarm data. For instance, the controller 112 may control the network module 114 to transmit, to the central alarm station server 170, alarm data indicating that a sensor 120 detected a door opening when the monitoring system was armed. The central alarm station server 170 may receive the alarm data and route the alarm data to the terminal 172 for processing by an operator associated with the terminal 172. The terminal 172 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 172 and 174 may be mobile devices or devices designed for a specific function. Although FIG. 2 illustrates two terminals for brevity, actual implementations may include more (and, perhaps, many more) terminals.

The one or more user devices 140, 150 are devices that host and display user interfaces. For instance, the user device 140 is a mobile device that hosts one or more native applications (e.g., the native surveillance application 142). The user device 140 may be a cellular phone or a non-cellular locally networked device with a display. The user device 140 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 140 may perform functions unrelated to the monitoring system, such as placing personal telephone calls, playing music, playing video, displaying pictures, browsing the Internet, maintaining an electronic calendar, etc.

The user device 140 includes a native surveillance application 142. The native surveillance application 142 refers to a software/firmware program running on the corresponding mobile device that enables the user interface and features described throughout. The user device 140 may load or install the native surveillance application 142 based on data received over a network or data received from local media. The native surveillance application 142 runs on mobile devices platforms, such as iPhone, iPod touch, Blackberry, Google Android, Windows Mobile, etc. The native surveillance application 142 enables the user device 140 to receive and process image and sensor data from the monitoring system.

The user device 150 may be a general-purpose computer (e.g., a desktop personal computer, a workstation, or a laptop computer) that is configured to communicate with the monitoring application server 160 and/or the monitoring system control unit 110 over the network 105. The user device 150 may be configured to display a surveillance monitoring user interface 152 that is generated by the user device 150 or generated by the monitoring application server 160. For example, the user device 150 may be configured to display a user interface (e.g., a web page) provided by the monitoring application server 160 that enables a user to perceive images captured by the camera 130 and/or reports related to the monitoring system. Although FIG. 2 illustrates two user devices for brevity, actual implementations may include more (and, perhaps, many more) or fewer user devices.

In some implementations, the one or more user devices 140, 150 communicate with and receive monitoring system data from the monitoring system control unit 110 using the communication link 138. For instance, the one or more user devices 140, 150 may communicate with the monitoring system control unit 110 using various local wireless protocols such as wifi, Bluetooth, zwave, zigbee, HomePlug (ethernet over powerline), or wired protocols such as Ethernet and USB, to connect the one or more user devices 140, 150 to local security and automation equipment. The one or more user devices 140, 150 may connect locally to the monitoring system and its sensors and other devices. The local connection may improve the speed of status and control communications because communicating through the network 105 with a remote server (e.g., the monitoring application server 160) may be significantly slower.

Although the one or more user devices 140, 150 are shown as communicating with the monitoring system control unit 110, the one or more user devices 140, 150 may communicate directly with the sensors and other devices controlled by the monitoring system control unit 110. In some implementations, the one or more user devices 140, 150 replace the monitoring system control unit 110 and perform the functions of the monitoring system control unit 110 for local monitoring and long range/offsite communication.

In other implementations, the one or more user devices 140, 150 receive monitoring system data captured by the monitoring system control unit 110 through the network 105. The one or more user devices 140, 150 may receive the data from the monitoring system control unit 110 through the network 105 or the monitoring application server 160 may relay data received from the monitoring system control unit 110 to the one or more user devices 140, 150 through the network 105. In this regard, the monitoring application server 160 may facilitate communication between the one or more user devices 140, 150 and the monitoring system.

In some implementations, the one or more user devices 140, 150 may be configured to switch whether the one or more user devices 140, 150 communicate with the monitoring system control unit 110 directly (e.g., through link 138) or through the monitoring application server 160 (e.g., through network 105) based on a location of the one or more user devices 140, 150. For instance, when the one or more user devices 140, 150 are located close to the monitoring system control unit 110 and in range to communicate directly with the monitoring system control unit 110, the one or more user devices 140, 150 use direct communication. When the one or more user devices 140, 150 are located far from the monitoring system control unit 110 and not in range to communicate directly with the monitoring system control unit 110, the one or more user devices 140, 150 use communication through the monitoring application server 160.

Although the one or more user devices 140, 150 are shown as being connected to the network 105, in some implementations, the one or more user devices 140, 150 are not connected to the network 105. In these implementations, the one or more user devices 140, 150 communicate directly with one or more of the monitoring system components and no network (e.g., Internet) connection or reliance on remote servers is needed.

In some implementations, the one or more user devices 140, 150 are used in conjunction with only local sensors and/or local devices in a house. In these implementations, the system 200 only includes the one or more user devices 140, 150, the sensors 120, the module 122, and the camera 130. The one or more user devices 140, 150 receive data directly from the sensors 120, the module 122, and the camera 130 and sends data directly to the sensors 120, the module 122, and the camera 130. The one or more user devices 140, 150 provide the appropriate interfaces/processing to provide visual surveillance and reporting.

In other implementations, the system 200 further includes network 105 and the sensors 120, the module 122, and the camera 130 are configured to communicate sensor and image data to the one or more user devices 140, 150 over network 105 (e.g., the Internet, cellular network, etc.). In yet another implementation, the sensors 120, the module 122, and the camera 130 (or a component, such as a bridge/router) are intelligent enough to change the communication pathway from a direct local pathway when the one or more user devices 140, 150 are in close physical proximity to the sensors 120, the module 122, and the camera 130 to a pathway over network 105 when the one or more user devices 140, 150 are farther from the sensors 120, the module 122, and the camera 130. In some examples, the system leverages GPS information from the one or more user devices 140, 150 to determine whether the one or more user devices 140, 150 are close enough to the sensors 120, the module 122, and the camera 130 to use the direct local pathway or whether the one or more user devices 140, 150 are far enough from the sensors 120, the module 122, and the camera 130 that the pathway over network 105 is required. In other examples, the system leverages status communications (e.g., pinging) between the one or more user devices 140, 150 and the sensors 120, the module 122, and the camera 130 to determine whether communication using the direct local pathway is possible. If communication using the direct local pathway is possible, the one or more user devices 140, 150 communicate with the sensors 120, the module 122, and the camera 130 using the direct local pathway. If communication using the direct local pathway is not possible, the one or more user devices 140, 150 communicate with the sensors 120, the module 122, and the camera 130 using the pathway over network 105.

In some implementations, the system 200 provides end users with access to images captured by the camera 130 to aid in decision making. The system 200 may transmit the images captured by the camera 130 over a wireless WAN network to the user devices 140, 150. Because transmission over a wireless WAN network may be relatively expensive, the system 200 uses several techniques to reduce costs while providing access to significant levels of useful visual information.

In some implementations, a state of the monitoring system and other events sensed by the monitoring system may be used to enable/disable video/image recording devices (e.g., the camera 130). In these implementations, the camera 130 may be set to capture images on a periodic basis when the alarm system is armed in an "Away" state, but set not to capture images when the alarm system is armed in a "Stay" state or disarmed. In addition, the camera 130 may be triggered to begin capturing images when the alarm system detects an event, such as an alarm event, a door opening event for a door that leads to an area within a field of view of the camera 130, or motion in the area within the field of view of the camera 130. In other implementations, the camera 130 may capture images continuously, but the captured images may be stored or transmitted over a network when needed.

In some implementations, one or more of the components of the system 200 (e.g., the monitoring application server 160) may be configured to operate as an analysis engine. The analysis engine may generate interfaces that intelligently present events detected by the monitoring system over a timeline. For example, the analysis engine may generate one or more of the interfaces shown in FIGS. 1A-1B. The interfaces may include a timeline that represents a density of events for particular times, and highlights abnormal events. In intelligently presenting events, the analysis engine may also present monitoring system data associated with particular times. For instance, the analysis engine may associate images taken with a particular time. When a user requests to view information related to the particular time, the analysis engine may identify the images based on the association with the particular time and, in response, present the images. In this regard, the analysis engine may intelligently present events detected by the monitoring system so that a user may quickly or easily understand events detected by the monitoring system.

The analysis engine may be run on the panel/firmware, on the backend, or on any other suitable component of the security system. In some examples, functionality of the analysis engine may be distributed among various components of the security system such that some functionality may be implemented by the panel/firmware and other functionality may be implemented by the backend.

In some implementations, all of the processing described throughout this disclosure may be implemented in a monitoring system control panel located inside the property being monitored, as opposed to sending data to an external server for processing. For example, rather than being a separate server located in a remote location, the monitoring application server 160 may be a logical component inside of the monitoring system control unit 110. In this example, the monitoring system control unit 110 performs the processing of the analysis engine without having to send sensor data to a separate server separated by a network.

In other implementations, all of the processing described throughout this disclosure may be performed on a remote server (e.g., monitoring application server 160). In these implementations, the monitoring system control panel (or sensors themselves) may send sensor data to the remote server over a network and the remote server may perform all of the analysis engine analysis of the sensor data. For instance, the monitoring system control unit 110 sends all captured sensor data to the monitoring application server 160 and the monitoring application server 160 performs the processing of the analysis engine.

In still further implementations, the processing described throughout this disclosure may be mixed between a monitoring system control panel and a remote server. In these implementations, the monitoring system control panel and the remote server may share operations needed to analyze the sensor data. For instance, the monitoring system control panel may perform the analysis engine analysis of the sensor data collected relatively recently (e.g., sensor data collected within the past three months) and the remote server may perform the analysis engine analysis of the sensor data collected over a longer period of time (e.g., sensor data collected over the past several years). In the example shown in FIG. 2, the processing described throughout this disclosure may be mixed between the monitoring system control unit 110 and the monitoring application server 160.

Figure 3A:
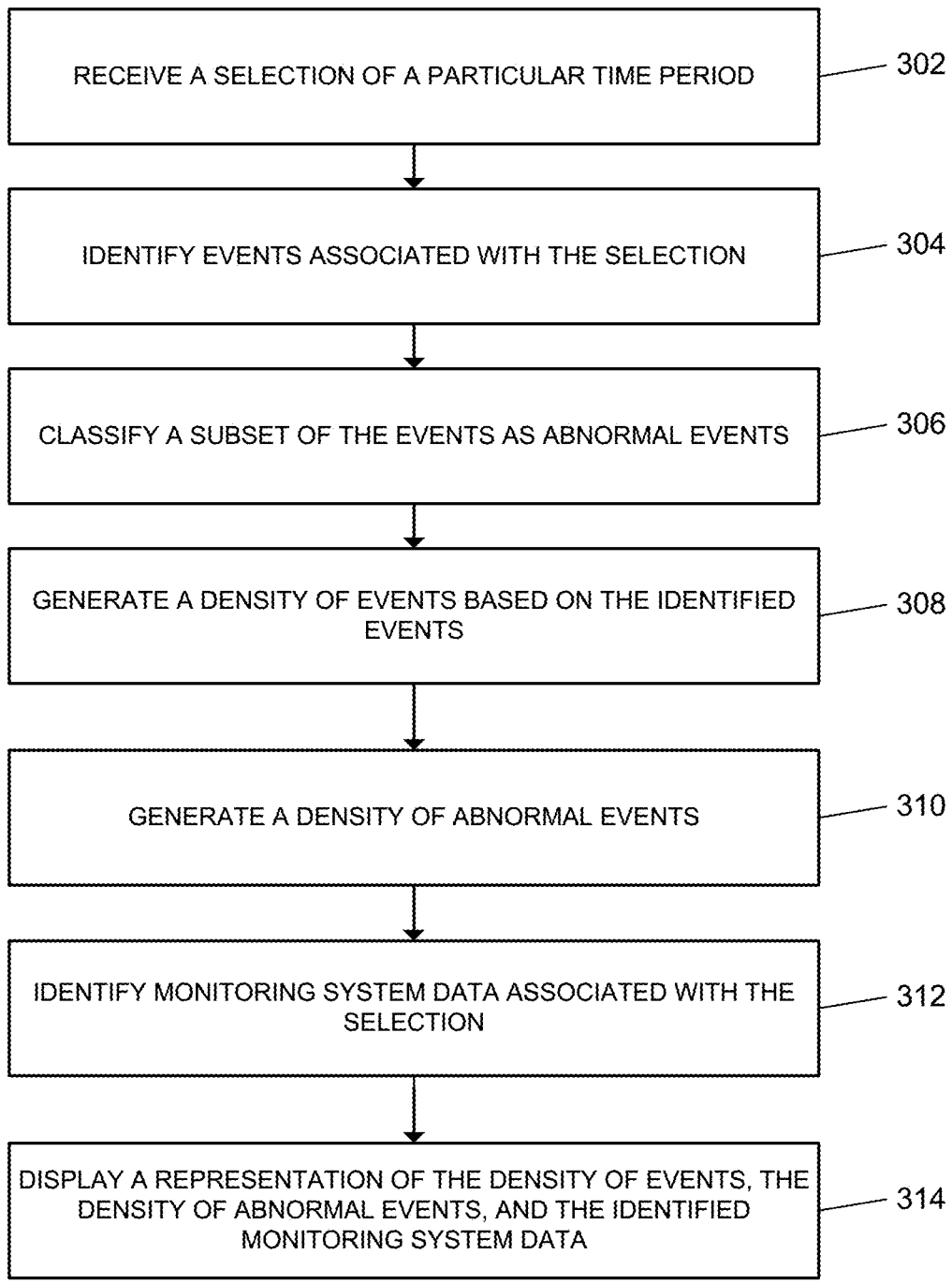
FIGS. 3A-B and 6 are flow charts of example processes.
Figure 3B:
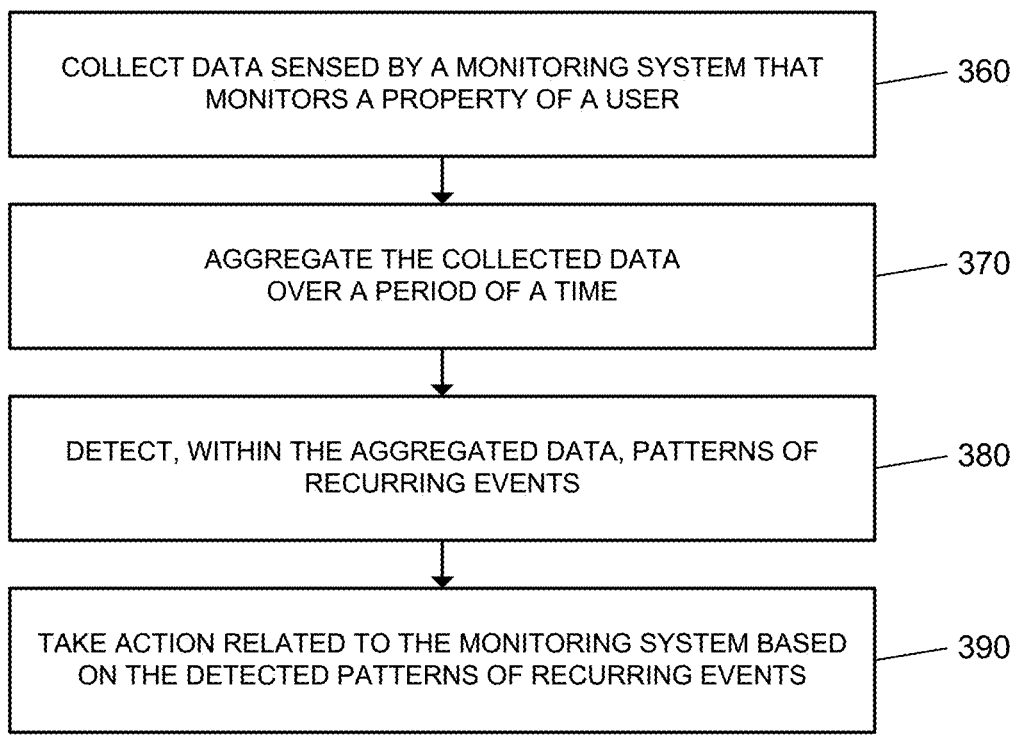

FIGS. 3A and 3B illustrate example processes. The operations of the example processes are described generally as being performed by the system 200. The operations of the example processes may be performed by one of the components of the system 200 (e.g., the monitor control unit 110, the monitoring application server 160, etc.) or may be performed by any combination of the components of the system 200. In some implementations, operations of the example processes may be performed by one or more processors included in one or more electronic devices.

FIG. 3A illustrates an example process 300 for displaying a representation of a density of events, density of abnormal events, and identified monitoring system data. The system 200 receives a selection of a particular time period (302). For example, the system 200 receives, over a network, a user selection of a particular time period, e.g., Feb. 11, 2015, to show in the timeline. In this example, the user selection may be made by a user inputting a particular date into a date selection element of the interface.

The system 200 identifies events associated with the selection (304). For example, the system 200 determines a time period identified by a selection, and identifies stored monitoring system data associated with that time period. For instance, the system 200 may determine that the selection is of Feb. 11, 2015, and identify events that occurred on Feb. 11, 2015.

In some implementations, the system 200 clusters monitoring system data based on an identified event. For example, if an event of Entering Home has been identified, activity that triggered the event such as activation of motion sensors or the opening of the garage door is clustered together to be presented to the user as a set associated with the Entering Home event.

The system 200 classifies a subset of the events as abnormal events (306). For example, the system 200 classifies a subset of the events as abnormal events. The system 200 may classify the subset of events based on stored abnormality data. For instance, the system 200 may classify any event associated with abnormality data as abnormal, or classify any event associated with abnormality data that indicates a confidence score of greater than particular threshold, e.g., 25%, 50%, 75%, etc., as abnormal.

The system 200 generates a density of events based on the identified events (308). The weights may be based on user-specified or manufacturer-specified weights for the types of events and/or a classification of the event as an abnormal event or normal event. The system 200 may generate the density of events for intervals of the particular time period based on the sum of the weights associated with each of the intervals. For instance, the system 200 may generate the density of events for each hour of Feb. 11, 2015.

The system 200 generates a density of abnormal events (310). For example, the system 200 may determine the weights that were associated with events classified as abnormal events. The system 200 may generate the density of events for intervals of the particular time period based on the sum of the weights for events classified as abnormal events for the interval.

The system 200 identifies monitoring system data associated with the selection (312). For example, the system 200 may identify video, images, and/or sound recordings that were captured during the particular time period. The system 200 may identify video, images, and/or sound recordings that were captured during the particular time period based at least on time stamps associated with stored monitoring system data.

The system 200 displays a representation of the density of events, the density of abnormal events, and the identified monitoring system data (314). For example, the system 200 displays an interface with a timeline where a line in the timeline represents a density of events for a particular time, where the portion of the density of events associated with abnormal events is highlighted in the timeline, and include a stream panel of events, video, images, and/or sound recordings associated with the time period.

The system 200 can determine what data to display for each event. For example, if a Leaving Home event is identified, the system 200 can select a camera still of the person leaving the home to represent the Leaving Home event. Monitoring data such as video, sensor data (temperature, humidity, fire alarm, CO levels, etc.) can be selected to represent the identified event.

FIG. 3B illustrates an example process 350 for taking action related to a monitoring system based on detected patterns of recurring events with aggregated monitoring data. The system 200 collects data sensed by a monitoring system that monitors a property of a user (360). For example, the system 200 receives, over a network, data describing sensor events detected by sensors fixed at the property of the user. In this example, the sensor events may be contact sensor events detected by door and window sensors located at doors and windows of the property, motion sensor events detected by motion sensors located at the property, and any other type of sensor events detected by other types described throughout this disclosure. The system 200 receives all sensor events detected by the monitoring system, regardless of whether the monitoring system is in an armed state or an unarmed state when the sensor events are detected.

The system 200 aggregates the collected data over a period of a time (370). For instance, the system 200 identifies the property and/or user associated with collected sensor events and stores sensor events collected over time for the identified property and/or user with an indication of the identified property and/or user. In this regard, the system 200 stores the collected sensor events in a manner that enables the system 200 to access all of the collected sensor events for the identified property and/or user. The system 200 may aggregate the collected sensor events over any period of time, including all sensor events collected over years, sensor events collected over a period of one or more months, sensor events collected over a period of one or more weeks, or other suitable time periods that enable the system 200 to detect recurring events in the aggregated sensor data.

The system 200 detects, within the aggregated data, patterns of recurring events (380). For instance, the system 200 analyzes the aggregated data to detect patterns of recurring sensor events in the aggregated data. The system 200 may detect events as events sensed by sensors of the monitoring system as well as a lack of sensor events detected. The system 200 may consider the timing of events, such as events that repeat on a routine basis (e.g., events that occur at the relatively same time everyday day or events that occur at the relatively same time on a particular day of the week). The system 200 also may consider orders in which events occur (e.g., a particular motion sensor event routinely precedes a particular door open event). The order of events may be considered with respect to timing or irrespective of timing.

In detecting patterns, the system 200 may consider any type of historical sensor activity detected by a monitoring system located at a property. The system 200 also may consider other types of activity, such as location data of one or more users of the monitoring system, data collected by sensors of a vehicle of one or more users of the monitoring system, weather data accessible to the monitoring system, or any other type of data that the system 200 is capable of collecting, aggregating, and analyzing.

To detect patterns within the aggregated data, the system 200 may use any type of data mining techniques capable of detecting patterns of recurring events. The system 200 may perform an automatic or semi-automatic analysis of relatively large quantities of sensor data to extract previously unknown interesting patterns, such as identifying groups of sensor events using cluster analysis, identifying unusual sensor events using anomaly detection, and identifying dependencies using association rule mining. Based on the patterns detected, the system 200 may assign a confidence score for each pattern that reflects a level of confidence that the detected pattern is actually a pattern of recurring events that will be observed in the future. The system 200 may determine the confidence score based on a percentage of time the pattern has occurred in the past, the amount of data used in detecting the pattern, and any statistical techniques that assess whether the pattern is a statistically significant pattern of recurring events.

The system 200 takes action related to the monitoring system based on the detected patterns of recurring events (390). For instance, the system 200 may store abnormality data that is used in classifying a subset of identified past monitored activity as abnormal activity as described above with respect to reference numeral 314.

FIG. 4 illustrates an example data record 400 that stores patterns detected within aggregated sensor data and confidence scores for each of the detected patterns. The data record 400 includes a first column 410 for a detected pattern and a second column 420 for a confidence score associated with the pattern stored in the column 410. As shown, a first detected pattern 430 indicates that the system 200 detected a pattern of a lack of sensor activity on Saturdays between seven in the morning to one in the afternoon. The first detected pattern 430 has a confidence score of sixty, which indicates that the pattern is more likely than not, but not overly confident (e.g., no sensor activity on Saturdays between seven in the morning to one in the afternoon has been detected sixty percent of the time).

A second detected pattern 440 indicates that the system 200 detected a pattern of arming the monitoring system in a "Stay" mode by eleven in the evening when all users are detected as being at home. The second detected pattern 440 has a confidence score of ninety, which indicates that the pattern is likely (e.g., arming the monitoring system in a "Stay" mode by eleven in the evening when all users are detected as being at home has occurred ninety percent of the time).

A third detected pattern 450 indicates that the system 200 detected a pattern of arming the monitoring system in an "Away" mode by nine in the morning when all users are detected as being away from home. The third detected pattern 450 has a confidence score of ninety-five, which indicates that the pattern is likely (e.g., arming the monitoring system in an "Away" mode by nine in the morning when all users are detected as being away from home has occurred ninety-five percent of the time).

A fourth detected pattern 460 indicates that the system 200 detected a pattern of window opening events being preceded by interior motion detection events. The window opening events may be for a specific window or all windows in a monitored property. The fourth detected pattern 460 has a confidence score of one hundred, which indicates that the pattern is very likely (e.g., window opening events have been preceded by interior motion detection events one hundred percent of the time).

A fifth detected pattern 470 indicates that the system 200 detected a pattern of back door opening events being preceded by interior motion detection events daily between six to seven in the morning and ten to eleven in the evening. The fifth detected pattern 470 has a confidence score of eighty, which indicates that the pattern is likely (e.g., back door opening events have been preceded by interior motion detection events daily between six to seven in the morning and ten to eleven in the evening eighty percent of the time).

A sixth detected pattern 480 indicates that the system 200 detected a pattern of a lack of sensor activity on Sundays between eight in the morning to noon. The sixth detected pattern 480 has a confidence score of seventy, which indicates that the pattern is more likely than not, but not overly confident (e.g., no sensor activity on Sundays between eight in the morning to noon has been detected seventy percent of the time).

In some implementations, the system 200 uses a threshold confidence score in determining whether or not to detect and continue monitoring a pattern. In these implementations, the system 200 may use a confidence score of sixty as a threshold (e.g., patterns that occur at least sixty percent of the time). Accordingly, patterns having a confidence score lower than sixty are not included in the data record 400 and do not impact the monitoring system, unless the pattern increases to warrant further consideration (e.g., increases to a confidence score at sixty or above).

Figure 5:
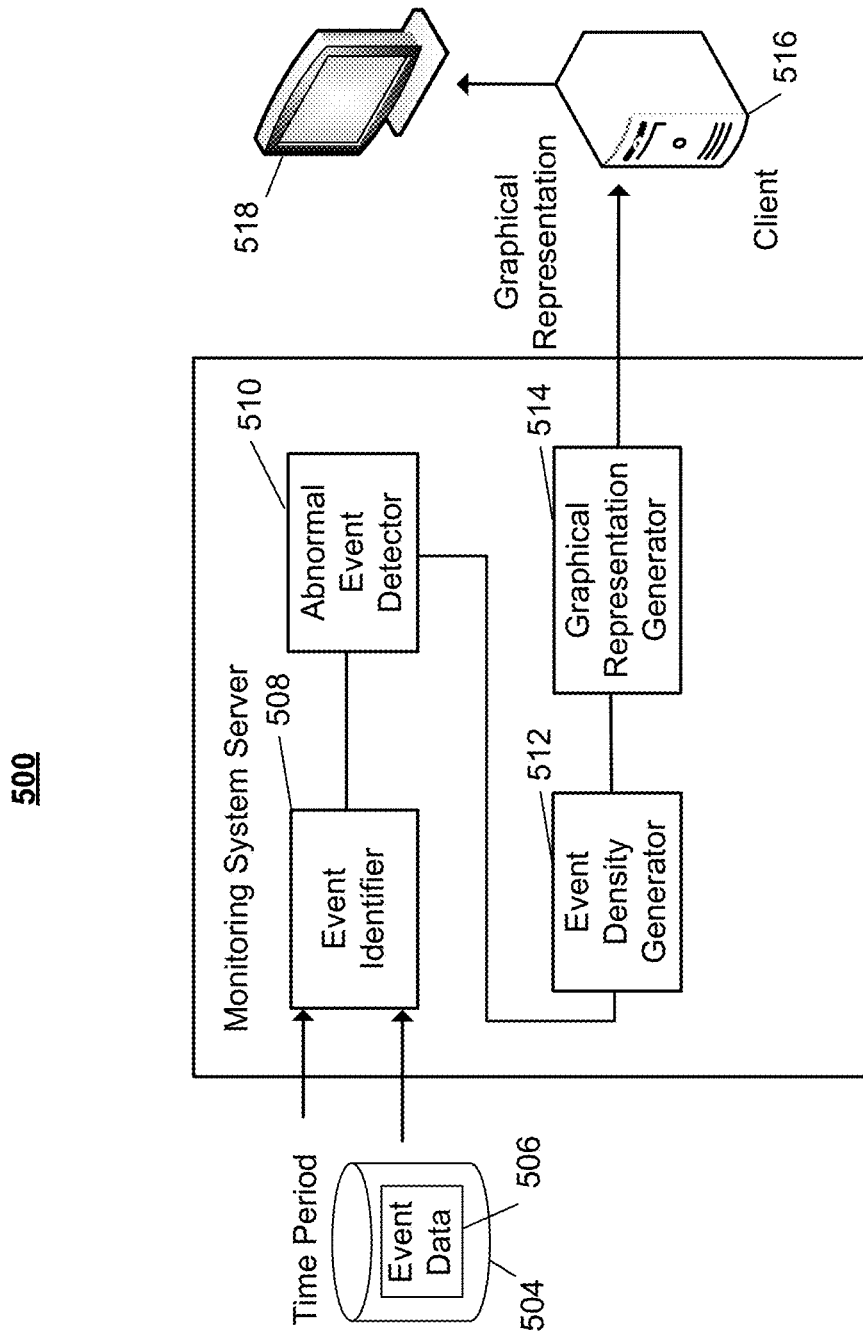

FIG. 5 illustrates an example system 500 for intelligently presenting events detected by a monitoring system. The system 500 includes a monitoring application server 502, event data 504, a database 506, an event identifier 508, an abnormal event detector 510, an event density generator 512, a graphical representation generator 514, a client device 516, and a display 518. The monitoring application server 502 can be an implementation of the monitoring applications server 160 of the system 200.

The event identifier 508, the abnormal event detector 510, the event density generator 512, and the graphical representation generator 514 can be components of the monitoring application server 502. In some implementations, the event identifier 508, the abnormal event detector 510, the event density generator 512, and the graphical representation generator 514 are electronic components. In other implementations, the event identifier 508, the abnormal event detector 510, the event density generator 512, and the graphical representation generator 514 are software modules or sets of instructions written in memory. The event identifier 508, the abnormal event detector 510, the event density generator 512, and the graphical representation generator 514 can be individual components, separate from the monitoring application server 502.

The monitoring application server 502 receives inputs of a time period and the event data 504. In some implementations, the event data 504 is received directly from associated monitoring systems. In other implementations, the event data 504 is retrieved from the database 506. The event data 504 can be communicated to the monitoring application server 502 through a network, a direct communication link between the monitoring application server 502 and associated monitoring system devices, through a monitor control unit (e.g., the monitor control unit 110 of the system 200), etc.

The event identifier 508 can receive the inputs of a time period and the event data 504. In some implementations, the inputs are communicated directly to the event identifier 508. The event identifier 508 can identify events associated with the time period from the event data 504. The event data 504 can be monitoring data indicating one or more events. For example, the event data 504 can be sensor and camera data indicating several arrival and departure events for a single home.

The event identifier 508 can use different types of monitoring data to identify one event. For example, if a home has door sensors and a camera, the event identifier 508 can use the door sensor data as well as the camera image of a user entering the home to determine that one of the homeowners has returned. The event identifier 508 can receive input from a user or manufacturer to identify events. For example, a manufacturer can specify that a typical sequence of a motion sensor, a door opening, and a camera image of a homeowner is an Entering Home event. A user can input personal events, such as Airing Out the Sunroom, by inputting a set of monitoring activity that indicates the event (e.g., opening every window in the sunroom, leaving the windows open for two hours, and closing every window in the sunroom).

The event identifier 508 can cluster different types of monitoring data together under one event. For example, the event identifier 508 can determine that video data and motion sensor data are related to a Leaving the Home event.

The data clustering can occur when the data is received and processed by monitoring application server 502. For example, monitoring application server 502 can cluster monitoring data before a user has requested information on events, reducing processing time when the user decides to request the data for display.

The abnormal event detector 510 can obtain the identified events from the event identifier 508. For example, the abnormal event detector 510 may receive an identification of a Door Opening event and an identification of a Kitchen Window Opening event. The abnormal event detector 510 classifies events as abnormal, and can flag such events, or otherwise identify them. For example, the abnormal event detector 510 may classify that the Door Opening event is normal and that the Kitchen Window Opening event is abnormal. Specific events or types of events can be classified as abnormal. For example, the system 500 can determine that any type of activity involving a person other than the house sitter while a homeowner is on vacation is abnormal.

Abnormal events can be classified based on machine learning. For example, the abnormal event detector 510 may learn patterns of activity that typically occur and classify any events that correspond with learned patterns as normal and any events that do not correspond with learned patterns as abnormal. Abnormal events may also be classified based on input from a manufacturer or a user. For example, the manufacturer can predefine events such as the front door opening in the middle of the night after the Going to Sleep event for all occupants has occurred. The system 500 can learn what types of events are considered abnormal from such manual user classification through use of historical data. In some examples, the historical data can come from other users of the same type of system. The data can be anonymized so that personal information is not revealed. The system 500 can prevent a user from accessing historical data not associated with his home.

The abnormal event detector 510 may classify events based on a person involved in the event. The abnormal event detector 510 can identify a person involved in an event through a number of methods, such as location tracking, occupancy detection, etc. For example, the system 500 can use facial, voice, or gesture recognition from image data collected. The system 500 can use any authentication method, for example, the system can use biometrics, a password, a token, an NFC fob, etc. The system 500 can use GPS tracking in conjunction with user electronic devices, such as cellphones. The system 500 can detect a user's presence using identification methods such as WiFi, Bluetooth, etc. connectivity. The system 500 can use historical data and/or machine learning to recognize patterns for the comings and goings of occupants of a home or building.

The abnormal event detector 510 can provide a confidence level for the abnormality of an event. For example, based on historical data from other users, a Door Opening event in the middle of the night classifies as an abnormal event. However, a particular user may often have people stopping by at night. The abnormal event detector 510 can identify people involved with the event, and if they are unrecognized, the abnormal event detector 510 can flag the Door Opening event as abnormal, with a confidence level of 95%. In some implementations, the abnormal event detector 510 can provide a confidence interval, standard deviation, etc. for the abnormality of the event. The abnormal event detector 510 can communicate the detected abnormal events to the event density generator 512.

The event density generator 512 generates a density over the input period of time for the events associated with the event data 504. The density represents the importance, frequency, etc. of identified events. The event density generator 512 determines weights for each identified event. The event density generator 512 can assign greater weights to abnormal events. For example, the event density generator 512 can apply a multiplier, add a constant, etc. to abnormal event weights.

The event density generator 512 can adjust weights to an identified event based on factors such as occupancy, system status, confidence, etc. For example, the system 500 can increase the weight of an abnormal event in which the security system is armed, there is no occupancy, and a Door Opening event occurs. In another example, the system 500 can decrease the weight of an abnormal event if a recognized person is involved. For example, the security system is armed and a Door Opening event occurs, but the homeowner is identified based on the monitoring data (e.g., through facial recognition, voice recognition, etc.).

The graphical representation generator 514 generates a graphical representation of the events associated with the received time period. In some examples, the representation is in the form of a timeline as shown in FIGS. 1A-B. The graphical representation is generated based on the weights determined by the event density generator 512. The graphical representation generator 514 can receive input from the user or manufacturer, and can alter the generated graphical representation based on the input. For example, a user can select preferences for display characteristics that differ from the predefined values from the manufacturer.

The graphical representation generator 514 can select a portion of the events in a cluster to present to the user. For example, the system 500 can identify twenty events having to do with the door opening while the home is unoccupied, and can present the user with a set of five events which the system 500 has determined to be abnormal, or otherwise important.

The graphical representation generator 514 can cluster the motion sensor and video data together, and select a representative piece of monitoring data to display for the event. The system 500 summarizes data collected from a highly instrumented home to provide users with a concise overview of important events. The system 500 can receive monitoring data, cluster the associated actions and events, identify or classify the event, and determine the most representative, or user preferred sensor data to display for the event.

In some implementations, the manufacturer or user can specify the type of monitoring data to be shown for a particular event. For example, the user can specify that she wishes to see the occupancy of the home when a Leaving Home event is identified. In some examples, the user can determine whether to alter weights for other events or classify other events as abnormal based on the clustering or data she is shown. For example, if there is no one left inside after the Leaving Home event, the user can specify that all events afterward are to be given greater weights.

The graphical representation can include interface elements which allow a user to drill down to a specific event type, different time period, etc. For example, the user can select a smaller subset of the received time period to focus on a specific period. The user can select a specific event type, abnormal events, etc. In some implementations, the identified events are filtered based on the selections made.

The graphical representation generator 514 can add information to the identified events. For example, the graphical representation generator 514 can add icons to events. The user can select the icons to view a specific event. In some implementations, the user can select multiple events to view, compare, annotate, or modify event details. For example, the user can select several Lights On events to create a new event type Waking Up. The system 500 can learn from the user's interactions with the generated graphical representation. In some implementations, the system 500 curates events and adjusts weights based on the user's interactions with the generated graphical representation.

The graphical representation generator 514 can emphasize events by visually modifying the event. If the events are shown on a timeline, the graphical representation generator 514 can alter the colors for the events shown. For example, the graphical representation generator 514 can display abnormal events in red, bold, etc. The graphical representation generator 514 can display an icon to indicate abnormal activity such as a caution symbol. In some implementations, the graphical representation generator 514 displays the representative monitoring data with the timeline. For example, the graphical representation generator 514 can display an image of a person entering the home with an abnormal Entering Home event.

In some implementations, the graphical representation generator 514 can deemphasize an event with a low weight, or that has been determined to be less important to a user. The graphical representation generator 514 can represent the event in a lighter color, with smaller text, without a representative sample of monitoring data, etc. For example, if the dog triggers a Motion Detected event every minute, the graphical representation generator 514 can deemphasize the detected events by displaying that portion of the timeline in a faint color with a thin line.

In some implementations, the graphical representation generator 514 allows users or manufacturers to sort by person. In other implementations, the graphical representation generator 514 can automatically sort by person. The graphical representation generator 514 can cluster events based on the person involved in the events, and display each person's events differently. For example, Sally's events can be displayed in red, while Dan's events are displayed in blue.

In some implementations, the graphical representation generator 514 modifies the graphical representation based on the user or properties of the user. For example, the graphical representation generator 514 can determine that Abe is requesting the graphical representation of the data, and can emphasize or filter by Abe's events. In other examples, the graphical representation generator 514 can determine what events and representative data to show based on the user's preferences, the user's permissions, etc.

The system 500 can prioritize events based on the event data 504. The system 500 can receive input from a user or the manufacturer indicating event types, users, etc. to prioritize. For example, John can prioritize his son Frank's Entering Home events to make sure that Frank is getting home safely after school. Each of Frank's Entering Home events can be given a greater weight, shown in a different color, represented by a picture, etc. John can deemphasize activity associated with Frank's Entering Home events that is not video. For example, John can deemphasize sensor data indicating that Frank has entered the home.

In some examples, the system 500 receives a request for data from a user, pulls the data from the database 506, and checks if events are already identified or classified as abnormal. The event data 504 can already indicate abnormal activity or a specific event as it is requested by the system 500. In some examples, the event data 504 is processed and classified as it is received. In other examples, the event data 504 is processed on request. Additional processing can be done automatically or on request. The generated graphical representation can be provided to a client 516 for display on a display 518.

Figure 6:
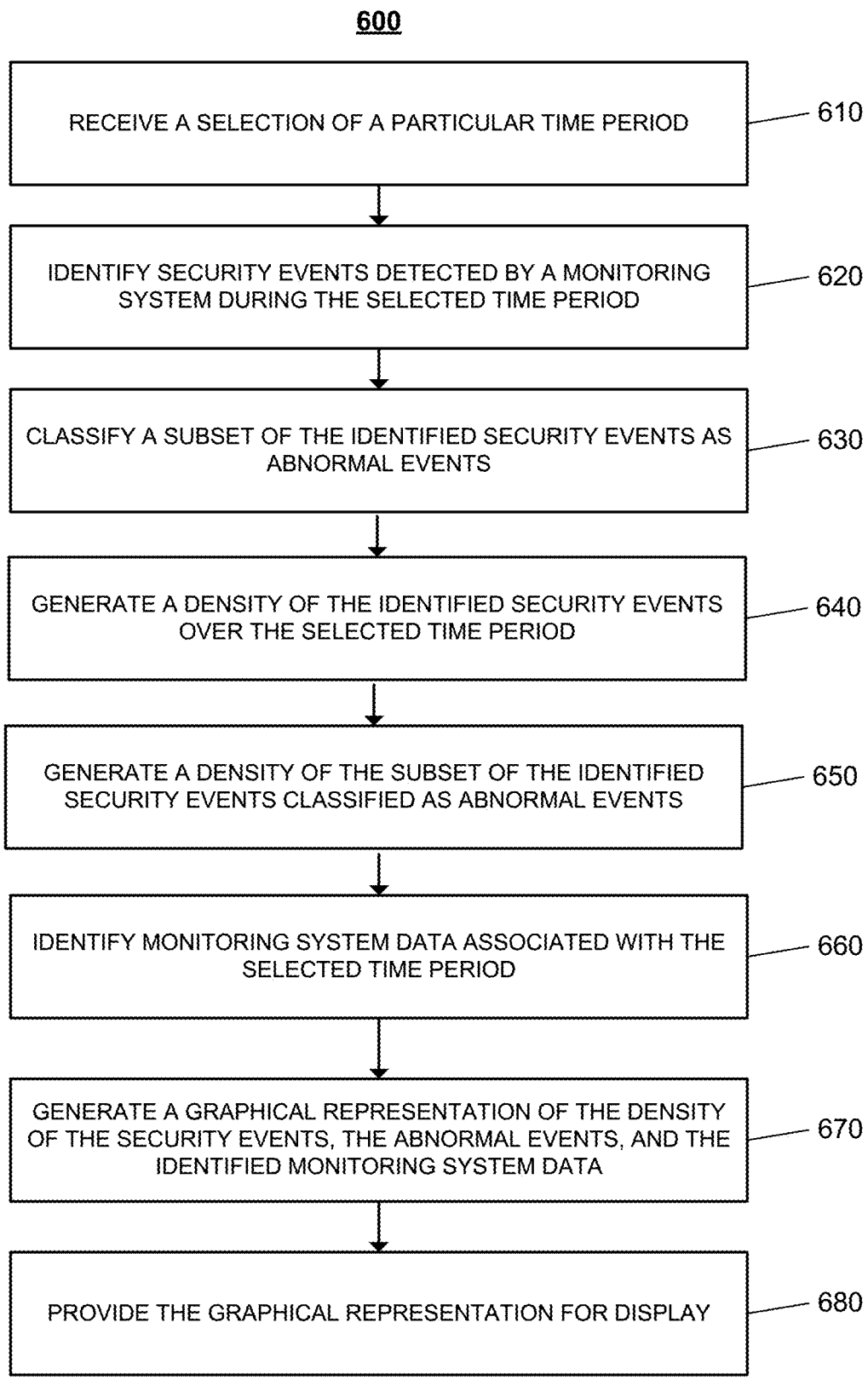

FIG. 6 is a flowchart for a process 600 that intelligently presents events identified by a monitoring system. Briefly, the process 600 includes receiving a selection of a particular time period (610). For example, the event identifier 508 may receive a selection of Feb. 20, 2015. The process 600 includes identifying security events detected by a monitoring system during the selected time period (620). For example, the event identifier 508 can identify a Door Opening event, a Garage Door Opening event, and a Kitchen Window Opening event on the evening of Feb. 20, 2015. The process 600 includes classifying a subset of the identified security events as abnormal events (630). For example, the abnormal event detector 510 can classify the Door Opening and Garage Door Opening events as normal, and the Kitchen Window Opening event as abnormal.

The process 600 continues by generating a density of the identified security events over the selected time period (640). For example, the event density generator 512 can generate a density of events, including the Door Opening event and the Garage Door Opening event, over Feb. 20, 2015. The process 600 includes generating a density of the subset of the identified security events classified as abnormal events (650). For example, the event density generator 512 can generate a density of abnormal events, including the Kitchen Window Opening event, over Feb. 20, 2015. The process 600 includes identifying monitoring system data associated with the selected time period (660). For example, the event identifier 508 may identify video from a camera in the home associated with the Door Opening, Garage Door Opening, and Kitchen Window Opening events, The process 600 includes generating a graphical representation of the density of the identified security events, the subset of the identified security events classified as abnormal events, and the identified monitoring system data (670). For example, the graphical representation generator 514 can generate a timeline displaying the density of the identified security events, the abnormal events, and the identified monitoring system data. The process 600 concludes with providing the graphical representation for display (680). For example, the graphical representation generator 514 may provide the graphical representation to a client 516 for display on a display 518.

Other arrangements and distribution of processing is possible and contemplated within the present disclosure.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A system comprising:
   a security monitoring server comprising:
   at least one processor; and
   at least one computer-readable storage medium coupled to the at least one processor having stored thereon instructions which, when executed by the at least one processor, causes the at least one processor to perform operations comprising:
   receiving a selection of a particular time period;
   identifying security events detected by a monitoring system during the selected time period;
   classifying a subset of the identified security events as abnormal events;
   generating a density of the identified security events over the selected time period;
   generating a density of the subset of the identified security events classified as abnormal events;
   identifying monitoring system data associated with the selected time period;
   clustering, from the identified monitoring system data, motion sensor and video data together;
   selecting a representative piece of the clustered monitoring system data to display in a manner that summarizes data collected from the monitoring system to provide an overview of important events during the selected time period;
   generating a graphical representation of the density of the identified security events, the density of the subset of the identified security events classified as abnormal events, and the representative piece of the clustered monitoring system data that provides the overview of important events during the selected time period; and
   providing the graphical representation for display.

2. The system of claim 1, wherein the graphical representation is colored based on the density of the identified abnormal events.

3. The system of claim 1, wherein classifying a subset of the identified security events as abnormal events comprises identifying security events indicated as abnormal events.

4. The system of claim 1, wherein classifying a subset of the identified security events as abnormal events comprises determining whether each of the identified security events is an abnormal event.

5. The system of claim 4, further comprising:
   generating a second graphical representation of the density of the subset of abnormal events including suggestions for actions based on the subset of abnormal events; and
   providing the second graphical representation for display with the first graphical representation.

6. The system of claim 1, wherein identifying security events detected by a monitoring system during the selected time period comprises obtaining clusters of monitoring data, representing security events, generated before identifying security events occurs.

7. The system of claim 6, wherein generating the graphical representation comprises selecting monitoring data representative of the identified security events from the associated clusters of monitoring data for display.

8. The system of claim 1, wherein identifying security events detected by a monitoring system during the selected time period comprises generating clusters of monitoring data representing security events.

9. The system of claim 8, wherein generating the graphical representation comprises selecting monitoring data representative of the identified security events from the associated clusters of monitoring data for display.

10. The system of claim 8, the operations further comprising:
    receiving input from a user, wherein generating the graphical representation is further based on the received input from the user.

11. The system of claim 1, wherein the graphical representation is a timeline.

12. The system of claim 1, wherein the monitoring system data is photographic or video data.

13. A method comprising:
    receiving, at a server, a selection of a particular time period;
    identifying, by the server, security events detected by a monitoring system during the selected time period;
    classifying, by the server, a subset of the identified security events as abnormal events;
    generating, by the server, a density of the identified security events over the selected time period;
    generating, by the server, a density of the subset of the identified security events classified as abnormal events;

identifying, by the server, monitoring system data associated with the selected time period;

clustering, from the identified monitoring system data by the server, motion sensor and video data together;

selecting, by the server, a representative piece of the clustered monitoring system data to display in a manner that summarizes data collected from the monitoring system to provide an overview of important events during the selected time period;

generating, by the server, a graphical representation of the density of the identified security events, the density of the subset of the identified security events classified as abnormal events, and the representative piece of the clustered monitoring system data that provides the overview of important events during the selected time period; and providing, by the server, the graphical representation for display.

14. The method of claim 13, wherein classifying a subset of the identified security events as abnormal events comprises identifying security events indicated as abnormal events.

15. The method of claim 13, wherein classifying a subset of the identified security events as abnormal events comprises determining whether each of the identified security events is an abnormal event.

16. The method of claim 13, wherein identifying security events detected by a monitoring system during the selected time period comprises obtaining clusters of monitoring data, representing security events, generated before identifying security events occurs.

17. The method of claim 16, wherein generating the graphical representation comprises selecting monitoring data representative of the identified security events from the associated clusters of monitoring data for display.

18. The method of claim 13, wherein identifying security events detected by a monitoring system during the selected time period comprises generating clusters of monitoring data representing security events.

19. The method of claim 18, wherein generating the graphical representation comprises selecting monitoring data representative of the identified security events from the associated clusters of monitoring data for display.

20. At least one computer-readable storage medium encoded with executable instructions that, when executed by at least one processor, cause the at least one processor to perform operations comprising:

receiving a selection of a particular time period;

identifying security events detected by a monitoring system during the selected time period;

classifying a subset of the identified security events as abnormal events;

generating a density of the identified security events over the selected time period;

generating a density of the subset of the identified security events classified as abnormal events;

identifying monitoring system data associated with the selected time period;

clustering, from the identified monitoring system data by the server, motion sensor and video data together;

selecting, by the server, a representative piece of the clustered monitoring system data to display in a manner that summarizes data collected from the monitoring system to provide an overview of important events during the selected time period;

generating a graphical representation of the density of the identified security events, the density of the subset of the identified security events classified as abnormal events, and the representative piece of the clustered monitoring system data that provides the overview of important events during the selected time period; and providing the graphical representation for display.

* * * * *